United States Patent [19]

Bardes

[11] Patent Number: 5,318,406
[45] Date of Patent: Jun. 7, 1994

[54] MULTIPART GAS TURBINE BLADE

[75] Inventor: Bruce P. Bardes, Montgomery, Ohio

[73] Assignee: General Electric Company, Cincinnati, Ohio

[21] Appl. No.: 970,518

[22] Filed: Nov. 2, 1992

[51] Int. Cl.[5] ............................................. F01D 5/14
[52] U.S. Cl. .............................. 416/223 A; 416/213 R; 416/241 R; 29/889.21; 29/889.22
[58] Field of Search ............ 416/223 R, 223 A, 241 R, 416/213 R, 198 A, 248; 29/889.21, 889.22, 463, 889.72, 889.721

[56] References Cited

U.S. PATENT DOCUMENTS

| 2,673,709 | 3/1954 | Barnes | 416/248 |
|---|---|---|---|
| 2,807,435 | 9/1957 | Howlett et al. | 416/248 |
| 2,825,530 | 3/1958 | Schum et al. | 416/248 |
| 3,552,898 | 1/1971 | Bird et al. | 29/494 |
| 3,588,980 | 6/1971 | Cogan | 29/156.8 |
| 3,656,222 | 4/1972 | Jones | 29/156.8 H |
| 3,753,794 | 8/1973 | Paulonis et al. | 148/32 |
| 3,801,222 | 4/1974 | Violette | 416/248 |
| 4,326,833 | 4/1982 | Zelahy et al. | 416/96 R |
| 4,364,160 | 12/1982 | Eiswerth et al. | 29/156.8 H |
| 4,417,381 | 11/1983 | Higginbotham | 29/889.721 |
| 4,478,638 | 10/1984 | Smith, Jr. et al. | 75/255 |
| 4,650,399 | 3/1987 | Craig et al. | 416/248 |
| 4,817,858 | 4/1989 | Verpoort | 228/193 |
| 4,830,934 | 5/1989 | Ferrigno et al. | 428/678 |
| 5,063,662 | 11/1991 | Porter et al. | 29/889.72 |
| 5,069,265 | 12/1991 | Blazek | 29/889.22 |
| 5,071,059 | 12/1991 | Heitman et al. | 228/244 |
| 5,106,266 | 4/1992 | Borns et al. | 416/248 |

FOREIGN PATENT DOCUMENTS

| 653267 | 5/1951 | United Kingdom | 416/248 |
|---|---|---|---|
| 2095589 | 10/1982 | United Kingdom | 29/889.721 |

*Primary Examiner*—John T. Kwon
*Attorney, Agent, or Firm*—Jerome C. Squillaro; Carmen Santa Maria

[57] ABSTRACT

A turbine blade comprises an airfoil/shank having a shank region and an airfoil region extending upwardly therefrom and two dovetail/platforms bonded thereto. The first dovetail/platform has a first dovetail region bonded to a first side of the shank region of the airfoil/-shank, with a first platform region extending outwardly from the first dovetail region. The second dovetail/platform has a second dovetail region bonded to a second side of the shank region of the airfoil/shank and a second platform region extending outwardly from the second dovetail region in a direction generally opposite to that of the first platform region.

12 Claims, 4 Drawing Sheets

MULTIPART GAS TURBINE BLADE

BACKGROUND OF THE INVENTION

This invention relates to gas turbine engines, and, more particularly, to the structure and fabrication of turbine blades used in such engines.

In a gas turbine engine such as used by jet aircraft, air is drawn into the front of the engine and compressed by a shaft-mounted compressor. The compressed air is mixed with fuel, and the mixture is burned in a combustor. The resulting hot exhaust gases are passed through a turbine that causes the compressor shaft to turn, and then out the rear of the engine to provide forward thrust.

The turbine of the gas turbine engine includes stationary turbine vanes that redirect the generally axial flow of hot exhaust gas so that it has a small sideways momentum component. Turbine blades are mounted on a turbine disk that in turn is mounted on a rotating shaft, usually the same shaft that turns the compressor. The impact of the hot exhaust gas on the turbine blades forces the turbine blades to rotate circumferentially. The turbine disk turns, driving the compressor through the rotation of the shaft.

The turbine blades and turbine vanes are key components of the gas turbine engine. They must operate in a high-temperature oxidizing environment, which may carry salt and other corrosive and erosive agents. The turbine blades operate under high stresses created by centrifugal forces as the turbine disk turns. The ability of the turbine blades and turbine vanes to operate in these conditions is essential to the efficient operation of the gas turbine engine, because engine efficiency increases with increasing temperature of the hot exhaust gas that enters the turbine section of the engine. The turbine blades of the high pressure section and the forward stages of the low pressure section of the turbine section experience the highest temperatures and operating stresses. In most cases, the performance of these turbine blades limits the performance of the engine. The present invention is of most direct benefit to these turbine blades, but is applicable to the other turbine blades in the turbine section as well.

Because of the critical importance of the turbine blades to the operation of the gas turbine engine, a great deal of attention has been directed to their improvement. Turbine blades are typically made of complex alloys of nickel, cobalt, and other elements. Alloys of this type have been developed specifically for this application. The turbine blades may be made as single crystals or directionally aligned polycrystals, to take advantage of the mechanical properties of particular crystallographic directions. The turbine blades are often coated with thermal barrier coating systems to increase the permissible temperature of the hot exhaust gas. The turbine blades also may have cooling channels therethrough so that cooling air can be passed through the interior of the blades to reduce the blade temperature.

Although turbine blades must be engineered to operate in these highly adverse environments, they must also be manufactured in a reasonably economical manner. A typical commercial gas turbine engine may contain 80 turbine blades or more, and the cost of the turbine blades can add a substantial amount to the initial cost of the engine and its repair costs as the turbine blades are replaced during the operating life of the engine. Thus, there is a continuing need for improved, reduced cost manufacturing techniques to fabricate complex gas turbine blades from superalloy materials and with the required crystallographic structures and orientations.

SUMMARY OF THE INVENTION

The present invention provides a structure of, and technique for preparing, gas turbine blades. The approach of the invention permits turbine blades to be manufactured less expensively than has been the case previously. The yield of acceptable turbine blades from the manufacturing process of the present invention is greater than that achieved with conventional approaches. The turbine blades may be made to have a crystallographic structure similar to that produced by conventional processing, or different structures that can be tailored for particular needs. The turbine blades produced by the approach of the present invention are compatible in form and fit with conventional turbine blades, so that no changes are required in the turbine disks or other components of the gas turbine engine in order to utilize the present turbine blades.

In accordance with the present invention, a multicomponent turbine blade comprises a fabricated airfoil/shank having a shank region and an airfoil region extending upwardly therefrom, and a fabricated dovetail/platform having a dovetail region attached to the shank region of the airfoil/shank and a platform region extending outwardly from the dovetail region. In a preferred embodiment, there are two dovetail/platforms, one attached to each side of the shank region and with their platforms extending in opposite directions. Each of the fabricated components is separately manufactured to substantially final condition prior to assembly together to form the blade. The components may be fabricated from the same ingot or from different ingots of material. The components may be made from the same materials or from different materials. In the description of this invention, fabricated is defined to include casting, machining, grinding, milling and other operations utilized in the manufacture of metal workpieces.

The resulting turbine blade has an outward appearance, generally the same as that of a conventional turbine blade, but is built from three separately fabricated pieces that are attached together to form the turbine blade.

Fabricating the turbine blade from three separate pieces permits the turbine blade to be manufactured less expensively and with greater design flexibility than conventional turbine blades. Advanced gas turbine blades are generally fabricated by directional casting techniques, either to produce a single crystal or a directionally-oriented polycrystal airfoil section. When the entire turbine blade is made from a single casting, it is difficult to achieve an acceptable crystal structure throughout the entire blade, including the dovetail and platform sections as well as the airfoil section. With the present approach, the airfoil/shank can be more readily made to have the desired crystallographic structure, and the dovetail/platforms can also be more readily made to have that same crystallographic structure as the airfoil shank or a different structure that may be more desirable in those regions of the turbine blade but cannot be provided in the conventionally prepared turbine blade. The airfoil/shank and the dovetail/platforms can also be made of different materials to optimize their performance.

In accordance with a manufacturing aspect of the present invention, a process for preparing a turbine blade comprises the steps of casting an airfoil/shank having a shank region and an airfoil region extending upwardly therefrom, casting a dovetail/platform having a dovetail region and a platform region extending outwardly from the dovetail region, and bonding the dovetail region of the dovetail/platform to the shank region of the airfoil/shank.

In one embodiment of the process, internal cooling channels can be provided in the airfoil/shank, and cooling air may be passed through the cooling channels during operation of the engine to cool the airfoil. To produce the cooling channels, the airfoil/shank can be cast with internal passages therein or it may be cast as a solid article and the passages thereafter introduced. In the latter approach, after the airfoil/shank is cast it is cut into two half sections, each half section including a portion of the shank region and a portion of the airfoil region, the two half sections being attached together along an airfoil/shank section bond surface. One or both of the half sections is machined to provide cooling channels. The two half sections are then bonded back together to form the finished airfoil region.

The preferred approach to bonding the half sections together, and to bonding the dovetail/platforms to the airfoil shank, is to place a brazing insert foil between the parts to be bonded, and thereafter to heat the parts and the brazing insert foil. The result is interdiffusion and bonding of the parts to be bonded.

The present approach thus provides an improved gas turbine blade and method for preparing the turbine blade.

DETAILED DESCRIPTION OF THE PREFERRED EMBODIMENTS

Figure 1:
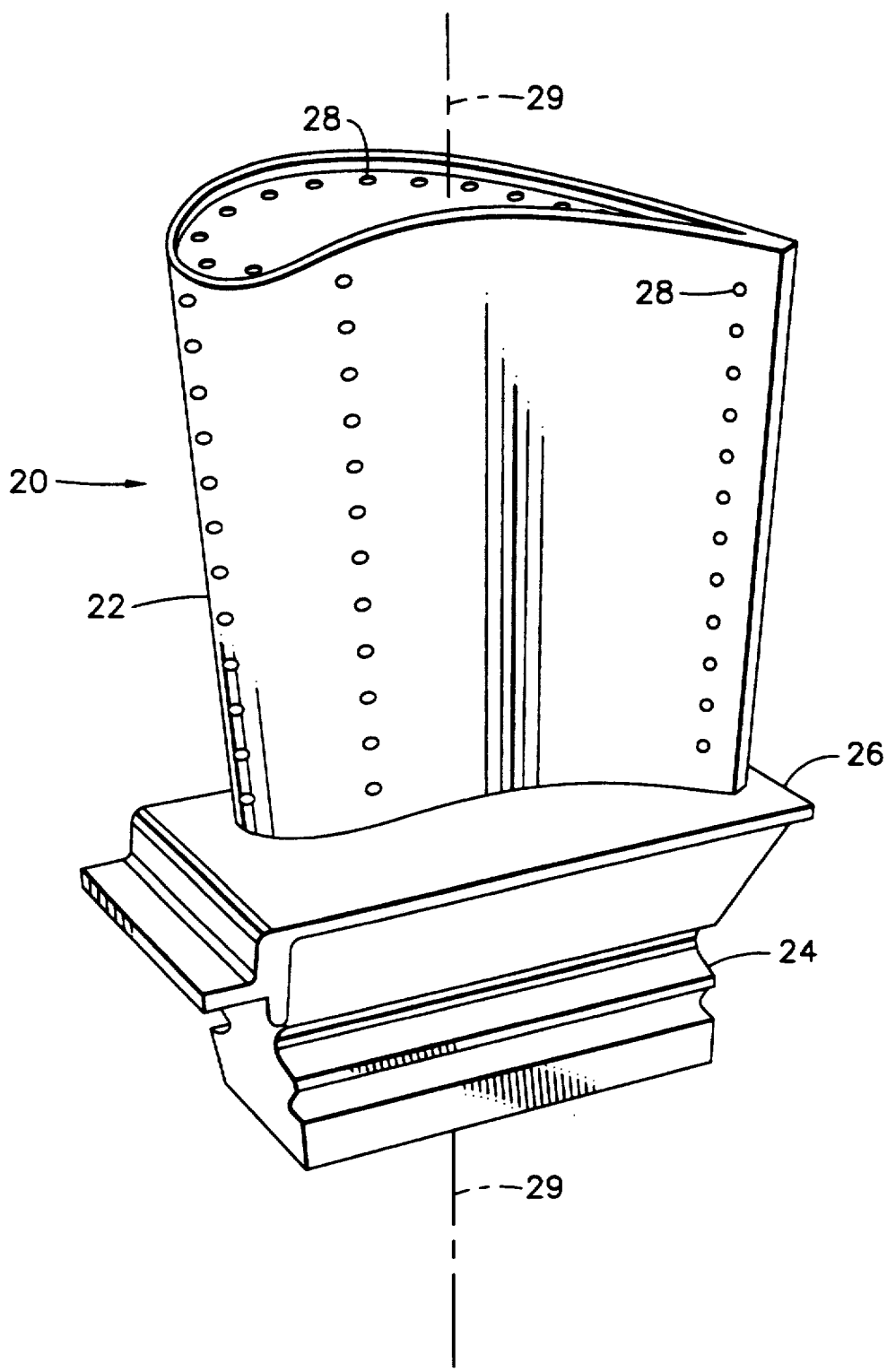
FIG. 1 is a perspective view of a gas turbine blade.

FIG. 1 depicts the overall configuration of a turbine blade 20. The turbine blade 20 includes an airfoil portion 22 against which the flow of hot exhaust gas is directed. The turbine blade 20 is mounted to a turbine disk (not shown) by a dovetail 24 which extends downwardly from the airfoil portion 22 and engages a slot on the turbine disk. A platform 26 extends longitudinally outwardly from the area where the airfoil portion 22 is joined to the dovetail 24. A number of cooling channels or cooling holes 28 desirably extend through the interior of the airfoil portion 22, ending in openings in the surface of the airfoil portion 22. A flow of cooling air is directed through the cooling channels, to reduce the temperature of the airfoil portion 22.

In the approach preferred in the industry, the turbine blade 20 is made from a single crystal that is oriented with a selected crystallographic direction (typically [001]) parallel to the long axis 29 of the airfoil portion 22, which is the principal stress direction when the turbine blade 20 is in service. Alternatively, the turbine blade 20 may be made polycrystalline with the individual crystals oriented to have the same selected direction parallel to the long axis 29 of the airfoil portion 22. Techniques for growing oriented single crystals and directionally solidified polycrystals are well known in the art.

The incentive to manufacture turbine blades by this approach lies in the gain in tensile strength and creep resistance over other types of cast turbine blades. This gain in properties is most important for the airfoil portion 22 of turbine blade 20. In the dovetail 24 and platform 26 of turbine blade 20, the improved properties offer little benefit, as operating temperatures are generally much lower in these sections. Also, it is relatively difficult to achieve consistently high-quality single crystal structures in the platform. The approach of the present invention provides the improved tensile strength and creep resistance in the portion of the blade where such properties are most needed, namely the airfoil portion 22, and reduced cost and improved ease of manufacture in the platform 26 and dovetail 24.

The turbine blade 20 may be made of any operable material, with nickel-base superalloys preferred. As used herein, a "nickel-base superalloy" is a complex alloy containing about 50 percent by weight or more of nickel and a variety of lesser alloying additions that improve its performance at elevated temperatures. This definition is specifically intended to include, but not be limited to, nickel aluminides NiAl and Ni$_3$Al and their alloys, as well as other alloys recognized by those in the art to be superalloys.

Figure 2:
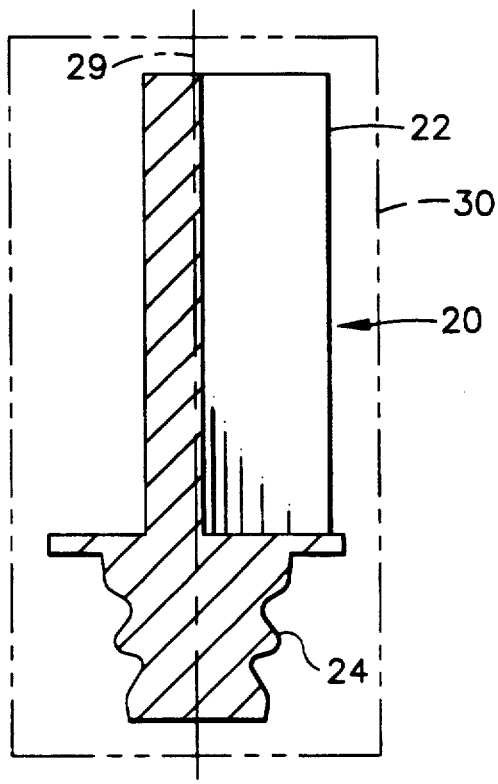
FIG. 2 is a sectional view of a gas turbine blade of FIG. 3 showing the original ingot from which the blade is machined, in phantom, as made by a prior art manufacturing approach.
Figure 3:
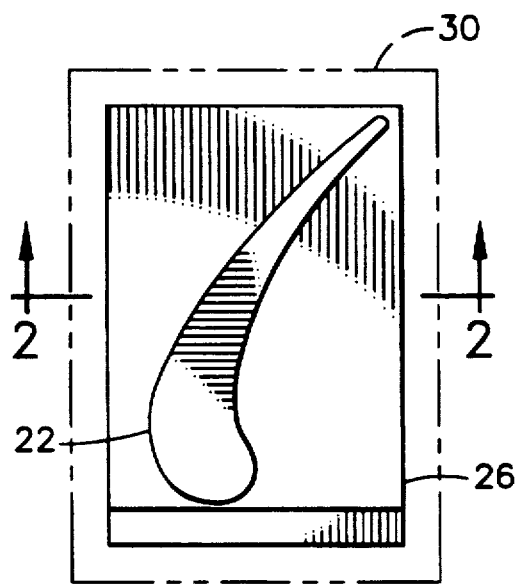
FIG. 3 is a top plan view of the prior art gas turbine blade of FIG. 2.

Those skilled in the art have long recognized the desirability of manufacturing long lengths of single crystal bar material, then cutting such bars into blanks 30, shown in phantom in FIGS. 2 and 3, from which blades are subsequently machined. Conceptually, a semi-continuous process for making single crystal bar is less costly and less prone to casting defects than making individual turbine blade castings. However, it has heretofore been necessary to make the cross section of such bars large enough to envelop the entire platform, as shown in the prior art approach of FIGS. 2 and 3, thereby consuming so much blade alloy material as to offset any economic advantage of this approach. The approach of the present invention permits the cross section of such bars to be only slightly larger than the cross section of the airfoil portion of the blade 22, thereby saving a significant amount of blade alloy material which would otherwise be wasted as machining scrap.

To prepare a turbine blade 20 by the most commonly used approach, blade 20 is cast to substantially its final shape, using an investment casting process. Variations in the investment casting process may be employed to produce single crystal or directionally solidified polycrystalline blades. The dovetail 24 is typically ground to final dimensions, and cooling holes are typically laser drilled. The turbine blade may be polished to produce the final turbine blade 20. The turbine blade 20 may then be coated with a thermal barrier coating system, if desired.

Figure 4:
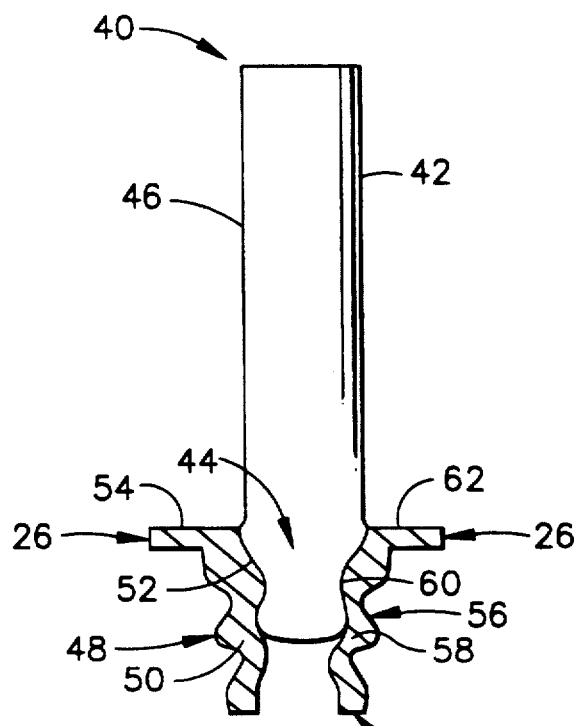
FIG. 4 is a sectional view of a turbine blade similar to FIG. 1 made by the present invention.

FIG. 4 is an end view of a turbine blade 40 of the present invention having the same overall configuration as the turbine blade 20 of FIG. 1, but configured and prepared according to the present approach. In accordance with this aspect of the invention, a turbine blade 40 comprises an airfoil/shank 42 having a shank region 44 and an integral airfoil region 46 extending upwardly therefrom. The airfoil region 46 has the same size and dimensions as the airfoil portion 22 of the prior art turbine blade 20. The shank region 44 may have a length substantially the same as that of the dovetail 24 of the turbine blade 20, or it may be shorter as depicted in FIG. 4, but is smaller in lateral dimension than dovetail 24. The airfoil/shank 42 is made by any operable method, such as casting of a single crystal or directionally-oriented polycrystal, and may incorporate cored cooling channels or holes 28 that lead to the openings. Alternatively, and as will be described later in detail, the cooling holes 28 can be introduced during the subsequent manufacturing operation.

A first dovetail/platform 48 has a first dovetail region 50 bonded to a first side 52 of the shank region 44 of the airfoil/shank 42. A first platform region 54 extends outwardly from the first dovetail region 50. A second dovetail/platform 56 has a second dovetail region 58 bonded to a second side 60 of the shank region 44 of the airfoil/shank 42 and a second platform region 62 extending outwardly from the second dovetail region 58 in a direction generally opposite to that of the first platform region 54. The shank region 44, first dovetail region 50, and second dovetail region 58 together form the dovetail 24 of turbine blade 40. The shank region 44 of airfoil/shank 42, and the cooperating dovetail regions 50 and 58 are preferably configured such that there is a mechanical interlock between these components, as shown in FIG. 4. Such mechanical interlocking may have a ball-and-socket configuration, interlocking serrations, a dovetail configuration, or any other shape that will support the joints mechanically as well as by bonding.

The three separately formed pieces, the airfoil/shank 42, first dovetail/platform 48, and the second dovetail/platform 56 when assembled together as shown in FIG. 4 form a turbine blade 40 having the desired overall configuration and shape.

Figure 5:
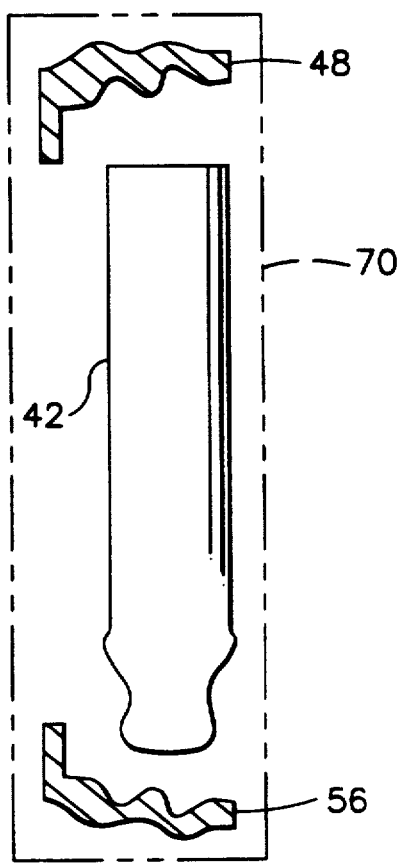
FIG. 5 is a sectional view of a block of single crystal material illustrating the approach of the present invention for manufacturing the turbine blade of FIG. 4.
Figure 6:
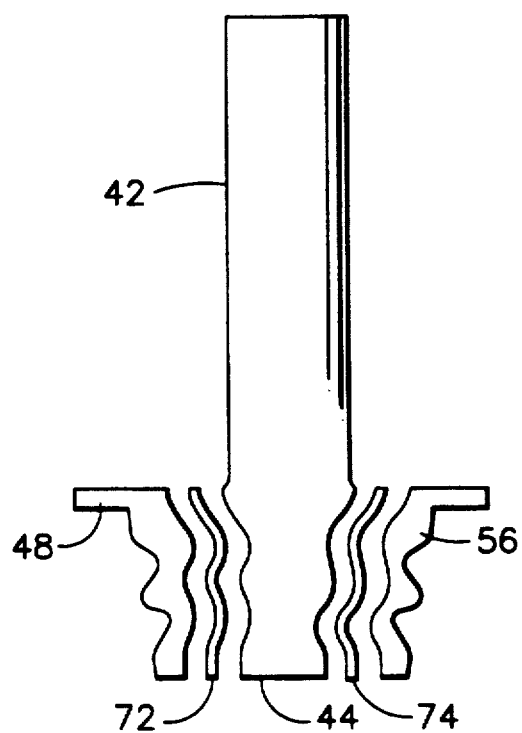
FIG. 6 is an exploded sectional view of the gas turbine blade of FIG. 4, illustrating the structure and arrangement of the several pieces, and the assembly of the turbine blade.

An important advantage of the present approach is illustrated in FIGS. 5 and 6, showing an ingot 70, in phantom, of single crystal or polycrystal material from which turbine blade 40 can be fabricated. The airfoil/shank 42, the first dovetail/platform 48, and the second dovetail/platform 56 can be cut from the ingot 70, even though it is much smaller in transverse dimension than the platform 26 depicted in FIG. 2. The ingot 70 can be grown with the desired crystallographic structure more easily than can the blade 20, because of its smaller transverse dimension, particularly in the platform region 26.

In the case shown in FIG. 5, the three pieces would have essentially the same crystallographic structure and composition. In another approach, the dovetail/platforms 48 and 56 could be fabricated from other ingots than the airfoil/shank 42. The dovetail/platforms 48 and 56 could therefore be made with different crystallographic structures (i.e., polycrystalline) or other compositions than the airfoil/shank 42. This combining of compositions and structures is not possible with the conventional approach.

The dovetail/platforms 48 and 56 are attached to the airfoil/shank 42 by any operable bonding process. Solid state diffusion bonding and various brazing processes may be employed. A preferred approach for bonding the dovetail/platforms 48 and 56 to the airfoil/shank 42 is illustrated in FIG. 6. The three pieces 42, 48, and 56 are arranged in the proper orientation, with a first metallic brazing insert foil 72 placed between the first dovetail/platform 48 and shank region 44, and a second metallic brazing insert foil 74 placed between the second dovetail/platform 56 and the opposite side of the shank region 44. This method and metallic brazing insert foil are known in the art, and are described in U.S. Pat. No. 3,753,794, whose disclosure is incorporated by reference. Briefly, the metallic brazing insert foils 72 and 74 are made of a superalloy whose composition reasonably approximates that of the turbine blade, to which about 0.5–1.5 weight percent boron is added. Alternatively, the brazing foils 72 and 74 are made of a nickel-based superalloy such as Rene' 80, whose nominal composition in weight percent is about 9.5 percent cobalt, 14 percent chromium, 4 percent molybdenum, 4 percent tungsten, 5 percent titanium, 3 percent aluminum, balance nickel, to which about 0.5-2.5 percent by weight boron is added. The amount of boron may is selected to depress the melting point of the alloy that forms the foils 72 and 74 so that heating to the depressed melting point causes the foils 72 and 74 to melt, without adversely affecting the parts of the blade. After the foils are melted, the entire assembly is maintained at a constant temperature at which the boron diffuses into the adjacent nickel-based superalloys of the dovetail/platforms 48 and 56 and the shank region 44, resulting in isothermal solidification of the bonding region and completion of the bond.

Figure 7:
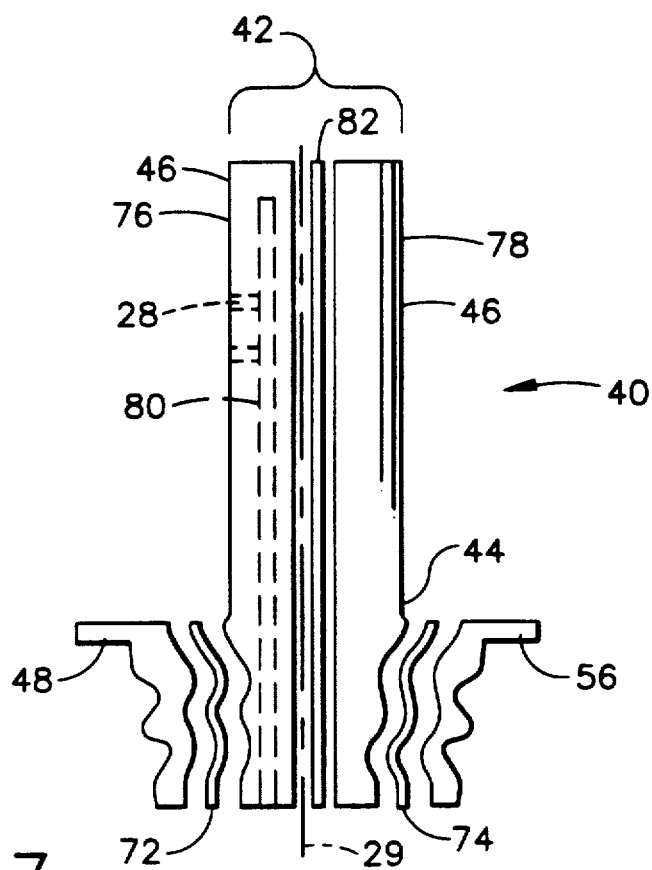
FIG. 7 is an exploded sectional view of a gas turbine blade similar to that of FIG. 4, and further having a sectioned airfoil region for facilitating the inclusion of cooling holes.

A useful modification of the approach of the invention is illustrated in FIG. 7. Here, the airfoil/shank 42 is prepared as discussed previously, and is thereafter cut along its long axis 29 to form two half sections 76, 78, each half section including a portion of shank region 44 and a portion of the airfoil region 46. At least one of the half sections 76, 78 is then machined, preferably to form channels 80 and other features that are useful as internal cooling passages in the turbine blade 40. Such sectioning and machining creates mating airfoil/shank section bond surfaces, along which the two half sections 76, 78 are then bonded together using a brazing insert foil 82 in the manner discussed previously. The first dovetail/platform 48 and the second dovetail/platform 56 are bonded onto the assembled half sections (now constituting the airfoil/shank 42) in the manner discussed previously. This sectioning, machining, and rejoining approach is known in the art. See U.S. Pat. No. 4,364,160, whose disclosure is incorporated by reference. However, the known art does not include the use of separate dovetail/platform parts, which are part of the present invention. In its most basic form, the prior art approach employs an ingot of superalloy 30, which is machined to external shape, sectioned, machined internally, and rejoined. See FIGS. 2 and 3.

Another method of bonding the various components of the turbine blade to each other employs mixtures of alloy powders, as disclosed in U.S. Pat. Nos. 4,478,638 and 4,830,934, whose disclosures are incorporated by reference. For example, a mixture of approximately equal amounts of two powder compositions is prepared. One powder composition reasonably approximates that of the turbine blade, and the other composition is similar but contains about 1-3 percent boron. The powder mixture is placed in the joint region and the assembly is heated in vacuum to a temperature where the boron-containing powder melts and wets both the other powder particles and the parts being joined. At this temperature the boron diffuses into the other powder particles and the parts being joined, thereby effecting isothermal solidification.

Whenever the practice of the present invention employs cutting the airfoil/shank into two pieces to machine internal cooling passages, it may be useful to join the two half sections 76 and 78 with a process that employs a higher temperature than the process for bonding the dovetail/platforms 48 and 56 to the assembled half sections. Whether the joining material are provided in foil form or as a mixture of powders, the compositions of the joining materials are adjusted so that the temperatures for making the two joints differ by at least about 100° F. Adjusting the boron content of the joining materials is effective in controlling the behavior of those materials at various bonding temperatures. Further adjustments in composition of the brazing materials may be necessary to ensure that the joining materials do not adversely affect the properties of the turbine blade materials, and that the specified mechanical properties of the turbine blade may be obtained through subsequent processing.

Figure 8:
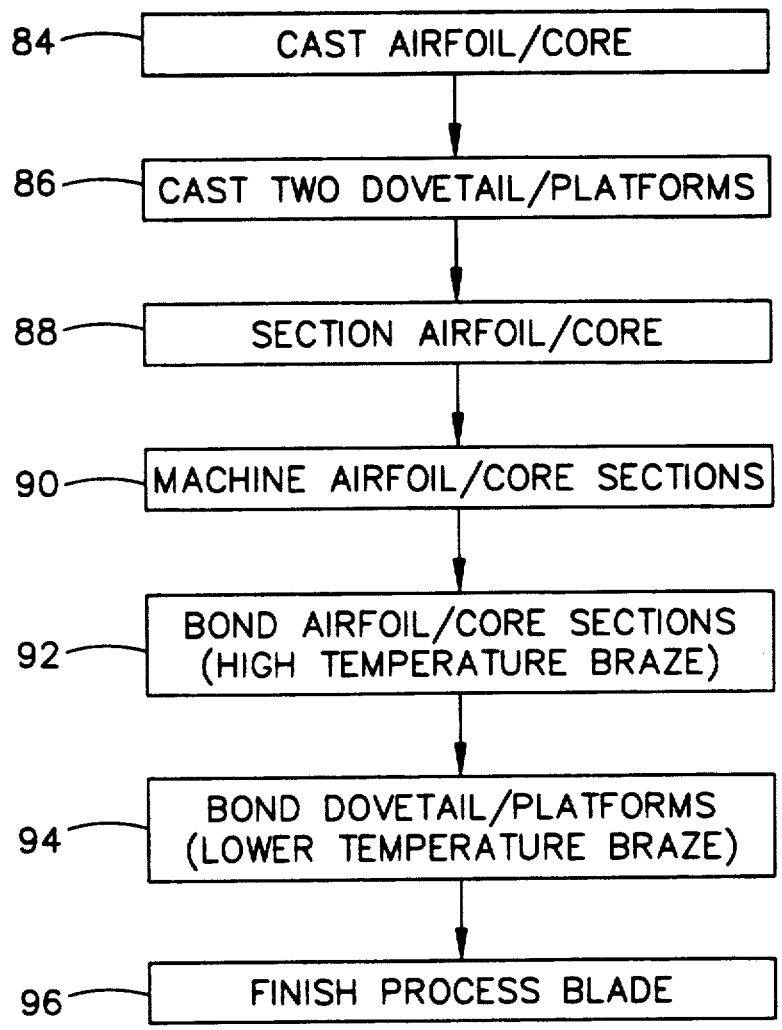
FIG. 8 is a block diagram of the production of the turbine blades of FIGS. 4 and 7.

FIG. 8 is a block diagram of the approach for manufacturing a turbine blade such as shown in FIG. 7. The airfoil/shank 42 and the dovetail/platforms 48 and 56 are cast, numerals 84 and 86, respectively. The airfoil/shank 42 is sectioned, numeral 88, and the half sections 76 and 78 are machined, numeral 90. The two half sections 76 and 78 are then bonded together, numeral 92. If the airfoil/shank 42 is not sectioned, the optional steps at numerals 88, 90, and 92 are omitted. The dovetail/platforms 48 and 56 are bonded to the shank region 44 of the airfoil/shank 42, numeral 94. The assembled turbine blade is final processed, numeral 96, using processes known in the art such as polishing and applying external layers such as thermal barrier coating systems.

The present invention provides an approach for preparing gas turbine engine turbine blades. It will be understood that various changes and modifications not specifically referred to herein may be made in the invention herein described, and to its uses herein described, without departing from the spirit of the invention particularly as defined in the following claims.

What is desired to be secured by Letters Patent follows.

What is claimed is:

1. A multicomponent turbine blade having improved tensile strength and creep resistance, comprising:
    a fabricated airfoil/shank having a shank region and an airfoil region extending upwardly therefrom, wherein the airfoil/shank has a first oriented microstructure of directionally-solidified nickel-base superalloy polycrystals which are parallel to the long axis of the airfoil/shank; and
    a fabricated dovetail/platform having a second microstructure and including a dovetail region and a platform region extending outwardly from the dovetail region, the dovetail region of the dovetail/platform being brazed to the shank region of the airfoil/shank.

2. The turbine blade of claim 1, wherein the first oriented microstructure of the airfoil/shank is a single crystal.

3. The turbine blade of claim 1, wherein the dovetail/platform is cast having a second oriented structure.

4. The turbine blade of claim 1, wherein the oriented structure of the dovetail/platform is a single crystal.

5. The turbine blade of claim 1, wherein the airfoil/shank comprises two half sections, each half section including a portion of the shank region and a portion of the airfoil region, the two half sections being attached together along an airfoil/shank section bond surface.

6. The turbine blade of claim 1, wherein the dovetail/platform is comprised of two sections, a first dovetail/platform section having a first dovetail region and a first platform region extending outwardly from the first dovetail region, the first dovetail region being attached to a first side of the shank region of the airfoil/shank in a direction generally opposite to that of the second platform region, and
    a second dovetail/platform section having a second dovetail region and a second platform region extending outwardly from the second dovetail region, the second dovetail region being attached to a second side of the shank region of the airfoil/shank in a direction generally opposite to that of the second platform region.

7. The turbine blade of claim 1, wherein the airfoil/shank is comprised of a first nickel-based superalloy and the dovetail/platform is comprised of a second nickel-based superalloy.

8. The turbine blade of claim 1, wherein the dovetail region is attached to the shank region along a nonplanar bonding surface.

9. A multicomponent turbine blade, comprising:
    a fabricated airfoil/shank having a shank region and an airfoil region extending upwardly therefrom, wherein the airfoil/shank has a first oriented structure of directionally-solified nickel-base superalloy polycrystals which are parallel to the long axis of the airfoil/shank;
    a first fabricated dovetail/platform having a first dovetail region and a first platform region extending outwardly from the first dovetail region, the dovetail region being brazed to a first side of the shank region of the airfoil/shank; and
    a second fabricated dovetail/platform having a second dovetail region and a second platform region extending outwardly from the second dovetail region, the dovetail region being brazed to a second side of the shank region of the airfoil/shank in a direction generally opposite to that of the first platform region.

10. The turbine blade of claim 9, further including a foil insert for brazing between each dovetail region and the shank region.

11. The turbine blade of claim 9, wherein the airfoil/shank is comprised of a first nickel-based superalloy and the dovetail/platforms are comprised of a second nickel-based superalloy.

12. The turbine blade of claim 9, wherein the first oriented microstructure of the airfoil/shank is a single crystal.

* * * * *